United States Patent [19]
Williams

[11] 3,929,304
[45] Dec. 30, 1975

[54] FILM CARTRIDGE
[75] Inventor: Francis A. Williams, Rochester, N.Y.
[73] Assignee: Eastman Kodak Company, Rochester, N.Y.
[22] Filed: Jan. 10, 1975
[21] Appl. No.: 540,296

[52] U.S. Cl. .................................. 242/194; 352/72
[51] Int. Cl.² ...................... G03B 1/04; G11B 15/32
[58] Field of Search .................. 242/194, 197–200, 242/71.1, 71.2–71.6; 352/72–78 R, 156

[56] References Cited
UNITED STATES PATENTS

| | | | |
|---|---|---|---|
| 3,648,943 | 3/1972 | Riogolini | 242/71.3 |
| 3,791,723 | 2/1974 | Komazaki | 352/72 |
| 3,860,195 | 1/1975 | Holzhauser et al. | 242/194 |
| 3,873,193 | 3/1975 | Iida | 352/72 |

*Primary Examiner*—Leonard D. Christian
*Attorney, Agent, or Firm*—K. D. Fosnaught

[57] ABSTRACT

A film cartridge for use in a camera of the type having an adjustable drive mechanism which may be actuated to vary the driving force applied to a rotatable film driving core in the cartridge. The cartridge includes a movable pressure plate operable to actuate the camera drive mechanism and apparatus for applying to such plate an actuating force directed generally parallel to the axis of rotation of the film driving core.

6 Claims, 7 Drawing Figures

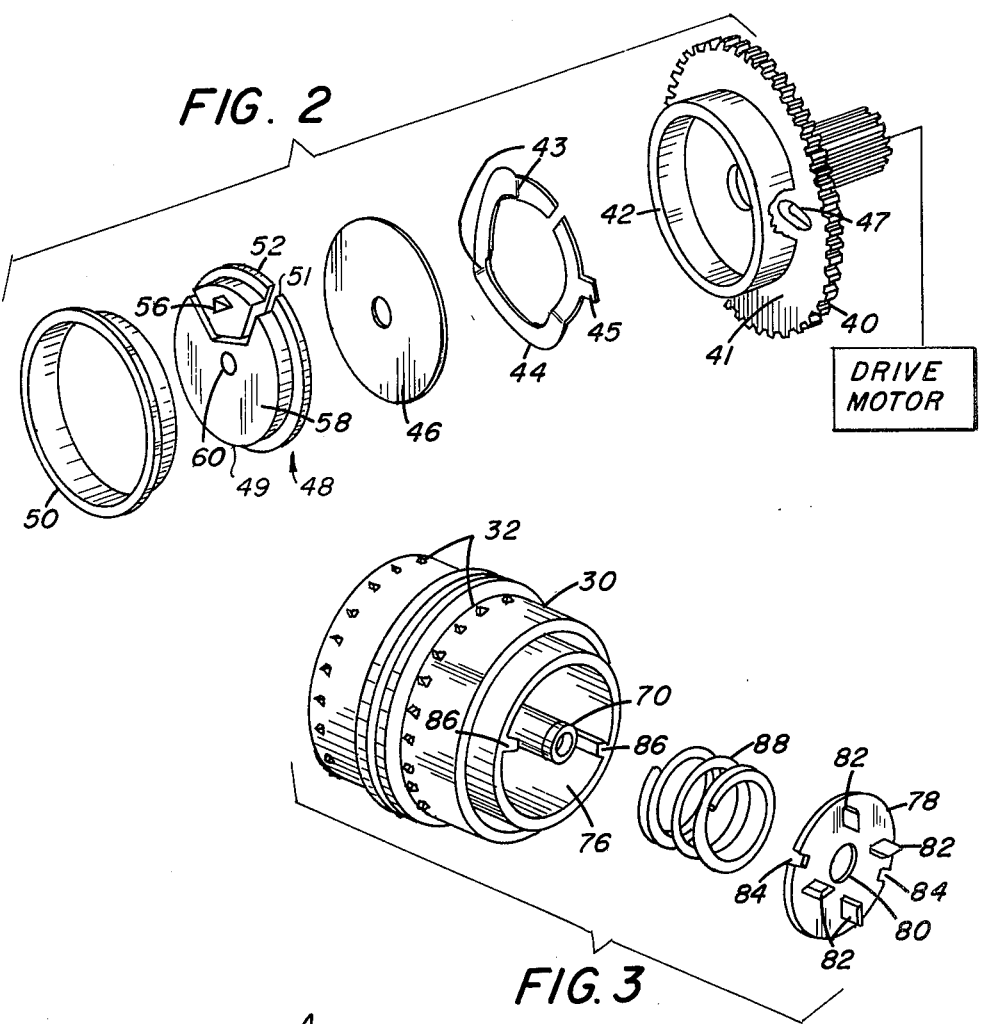
FIG. 2
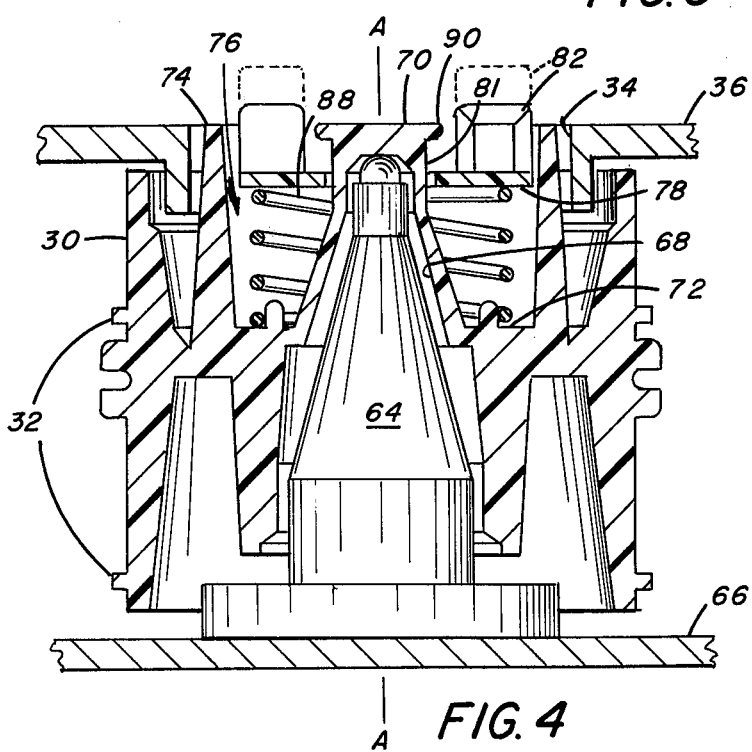
FIG. 3
FIG. 4

FILM CARTRIDGE

CROSS-REFERENCE TO RELATED APPLICATIONS

Reference is hereby made to commonly-assigned copending U.S. patent application Ser. No. 438,990 entitled "Adjustable Drive Mechanism for a Motion Picture Camera", filed on Feb. 4, 1974, in the name of R. I. Gresens; commonly-assigned copending U.S. patent application Ser. No. 336,863 entitled "Door Assembly for Motion Picture Camera", filed on Feb. 28, 1973, in the name of H. H. Dudley et al., now U.S. Pat. No. 3,807,841; commonly-assigned copending U.S. patent application Ser. No. D-411,125, entitled "Design for Film Cartridge", filed on Oct. 30, 1973, in the name of H. H. Dudley et al.; commonly-assigned copending U.S. patent application Ser. No. 451,640 entitled "Film Cartridge and Associated Drive Means", filed on March 15, 1974, in the name of J. S. Chandler et al.; commonly-assigned copending U.S patent application Ser. No. 250,352 entitled "Disabling Device for Anti-Backup Mechanism in a Film Cartridge", filed on May 4, 1972, in the name of Holzhauser et al., now U.S. Pat. No. 3,860,195; commonly-assigned copending U.S. patent application Ser. No. 248,514 entitled "Film Cartridge", filed on Apr. 28, 1972, in the name of Stephen H. Miller now U.S. Pat. No. 3,785,726; and commonly-assigned copending U.S. patent application Ser. No. 451,714 entitled "Film Cartridge", filed on March 15, 1974, in the name of E. E. Dorland et al.

BACKGROUND OF THE INVENTION

1. Field of the Invention

This invention relates to a motion picture cartridge of the type cooperable with a camera, or the like, having a drive mechanism that may be actuated to adjust the drive force output of the mechanism in accordance with the force requirements of one of two dissimilar cartridge types. More particularly, the invention relates to apparatus carried by the film drive core of one such cartridge type for providing an actuating force to the camera drive mechanism, such force being directed generally parallel to the axis of rotation of the cartridge core.

2. Description Relative to the Prior Art

A common type of Super 8 film cartridge is a 50-foot (about 15-meter) silent cartridge which is described in commonly-assigned U.S. Pat. No. 3,208,686, issued Sept. 28, 1965, in the name of E. A. Edwards et al. Due to the structure of this type of cartridge, a film-driving torque must be applied to a cartridge take-up core on which film is wound when it enters the take-up chamber of the cartridge. For this type of cartridge, when loaded with many conventional films, the driving torque may be anywhere in the range of 0.5 to 1.5 inch-ounces (about $3.5 \times 10^{-3}$ to $10.6 \times 10^{-3}$ newton-meters). However, for some "slippery" films, the torque to be applied preferably is in the lower half of this range (i.e., 0.5 to 1.0 inch-ounces ... about $3.5 \times 10^{-3}$ to $7.1 \times 10^{-3}$ newton-meters). When "slippery" film is loaded into the cartridge and a torque over 1.0 inch-ounces is applied, the film is subject to "pull-through", i.e., the torque applied to the take-up core causes some advancement of film in the area of the exposure aperture. When such film is projected, the images are unsteady. It is believed that this "pull-through" of "slippery" film can be substantially avoided by keeping the torque applied to the take-up core within a range of 0.5 to 1.0 inch-ounces.

A very common camera drive mechanism for supplying a substantially constant driving torque that falls within the desired operating range is a friction drive of a type which includes a driven portion and a drive portion which are frictionally coupled by a slip clutch member. As is well known, such a friction drive is economical to manufacture and provides reliable operation for advancing the film in the cartridge.

Two new types of film cartridges are disclosed generally in commonly-assigned U.S. Pat. No. 3,782,812, issued Jan. 1, 1974 in the name of T. W. Roller, and in U.S. Pat. No. 3,767,294, issued Oct. 23, 1973 in the name of G. J. Kosarko, and in the before-mentioned copending U.S. patent application Ser. Nos. 248,514 and 451,640. These cartridges are suitable for supporting a 50-foot length of sound film and a 200-foot (about 60-meter) length of sound or silent film, respectively. In view of these new film cartridges, it is desirable to provide a single motion picture camera adapted to accommodate interchangeably either the new, larger-capacity cartridge or one (or both) of the smaller capacity cartridges. The 50-foot sound cartridge is designed to operate within the same range of torque forces as the 50-foot silent cartridge; however, for the larger capacity cartridge, a torque range of 1.0 to 1.5 inch-ounces (about $7.1 \times 10^{-3}$ to $10.6 \times 10^{-3}$ newton-meters) is preferred. Therefore, aside from the requisite changes in the camera structure to accept the larger physical dimensions of the two new types of cartridges, it is desirable to provide a driving member which selectively furnishes one driving torque in a low range (0.5 to 1.0 inch-ounces) to the smaller-capacity cartridges and a second torque in a higher range (1.0 to 1.5 inch-ounces) to the larger-capacity film cartridge. In addition, it is desirable to produce a friction drive which will sense the type of cartridge received and will automatically shift the operation of the friction drive to the desired operating range.

To accommodate cartridge having dissimilar torque requirements, the apparatus described in U.S. patent application Ser. No. 438,990 includes a friction clutch which normally operates at a first torque range but which may be shifted to a second range in response to movement of a spring-loaded probe from a normal, extended position to a depressed position. A film cartridge requiring drive torque in the second range includes an abutment surface carried by a rotatable cartridge drive core and disposed to contact and depress the probe when the cartridge is in the camera. In some instances, however, the pressure of the resilient probe, when exerted against the cartridge core at a point radially displaced from the axis of rotation of the core, may cause the core to tilt with respect to its mount. Such tilt may cause the core to bind and present undue resistance to rotation.

SUMMARY OF THE INVENTION

In accordance with the present invention, there is provided a web-handling cartridge cooperable with a camera of the type having a drive mechanism for rotating a film-advancing core carried by the cartridge and also having a selectively actuatable clutch for adjusting the driving force produced by the drive mechanism. The cartridge core carries means for actuating the clutch, including means for applying an actuating force directed generally parallel to the axis of rotation of the core. In the preferred embodiment, the clutch actuating means includes a plate member mounted for limited axial movement along the core axis and disposed to enter into operable relationship with the clutch apparatus when the cartridge is received in the camera.

BRIEF DESCRIPTION OF THE DRAWINGS

In the detailed description of the preferred embodiment of the invention presented below, reference is made to the accompanying drawings wherein:

FIG. 2 is an exploded perspective view of the adjustable camera drive mechanism of FIG. 1;

FIG. 3 is an exploded perspective view of the cooperating film catridge structure of FIG. 1;

FIG. 4 is a cross-section through the assembled apparatus of FIG. 3;

DESCRIPTION RELATIVE TO THE PREFERRED EMBODIMENT

Because film cartridges and cameras are well known, the present description will be directed in particular to elements forming part of, or cooperating more directly with, the present invention. Apparatus not specifically shown or described herein may be selected from those known in the art.

Figure 1:
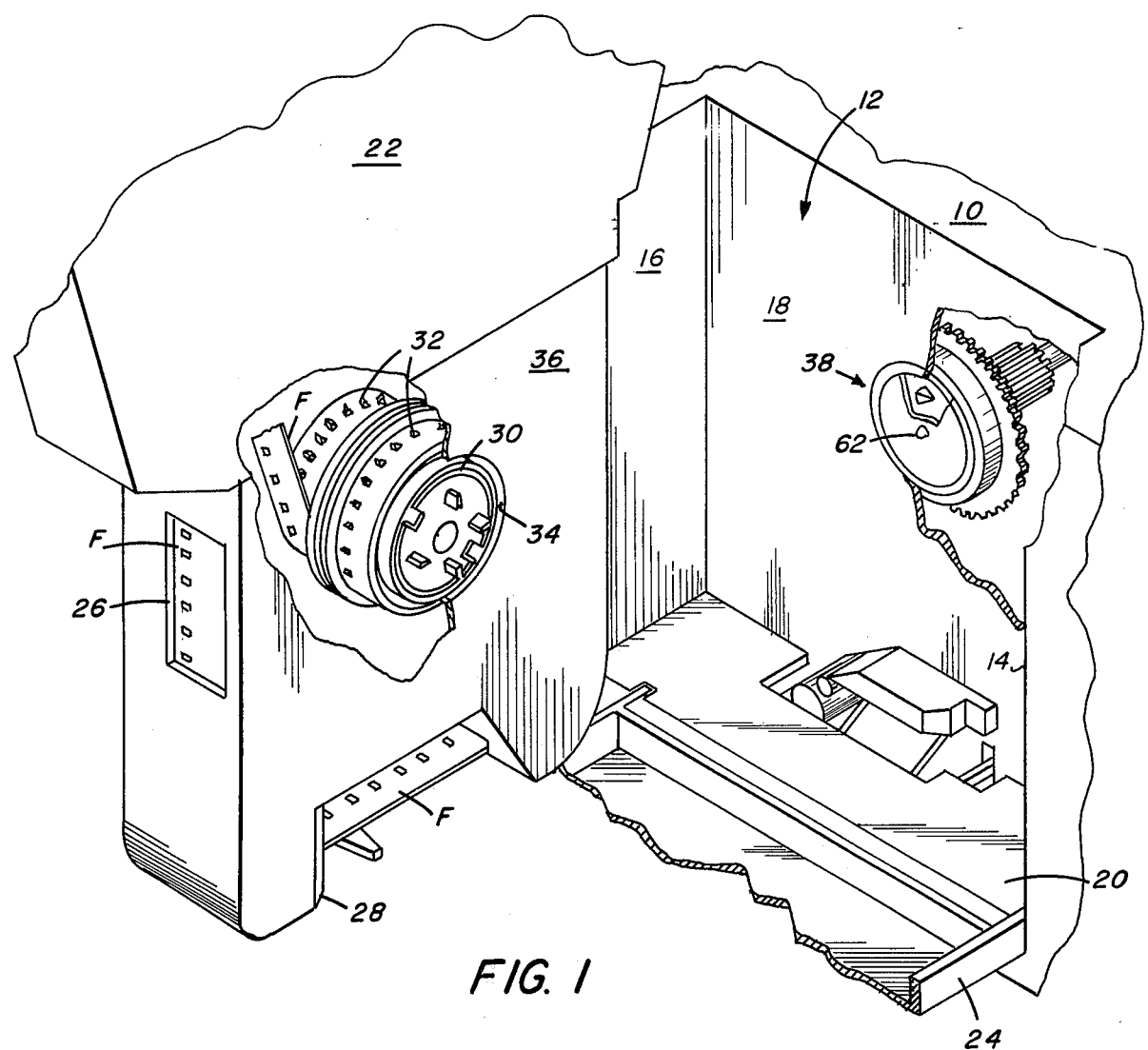
FIG. 1 is a fragmentary perspective view of a camera having an adjustable drive mechanism and a film cartridge incorporating apparatus in accordance with the present invention for cooperation with such mechanism.
Figure 5:
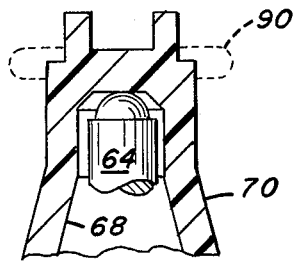
FIG. 5 is a partial view of the cross-section of FIG. 4 taken at a time prior to assembly.

FIG. 1 depicts a motion picture camera 10 having a cartridge-receiving chamber 12 defined in part by walls 14, 16, 18, and 20 which are adapted to mate with either a portion of a received film cartridge 22 or with the edges of a camera cover 24 in order to make chamber 12 light-tight. Such an arrangement is described in greater detail in commonly-assigned copending U.S. patent application Ser. No. 336,863 entitled "Door Assembly for Motion Picture Camera", filed on Feb. 28, 1973 in the name of Dudley et al. now U.S. Pat. No. 3,807,841. A camera of this type may advantageously be adapted to receive one of several types of cartridges including the relatively large cartridge 22 which may contain a relatively long length of film (e.g., about 200 feet). Such a cartridge is described in commonly-assigned copending U.S. patent application Ser. No. D-411,125, entitled "Design for Film Cartridge", filed on Oct. 31, 1973 in the name of Dudley et al.; in commonly-assigned U.S. patent application Ser. No. 451,640 entitled "Film Cartridge and Associated Drive Means", filed on March 15, 1974, in the name of J. S. Chandler et al.; and in commonly-assigned copending U.S. patent application Ser. No. 451,714 entitled "Film Cartridge", filed on Mar. 15, 1974 in the name of E. E. Dorland et al. As described therein, the cartridge 22 is operable to store the film strip F and to advance such strip through the cartridge and past openings 26 and 28 for presentation to work stations in the camera.

To assist in transporting film F through the cartridge, a rotatable drive core 30 is provided having a double set of sprocket teeth 32 adapted to engage spared perforations formed in the film. An opening 34 in cartridge wall 36 provides for access to the core by a core drive mechanism 38 carried by camera 10 to rotate the core during use.

As previously indicated, the core-rotating force applied to a cartridge may vary in accordance with the type of cartridge being driven. For example, a Super 8 cartridge of the type described in U.S. Pat. No. 3,208,686 desirably receives a driving force in the range of about 0.5 to 1.0 inch-ounces, preferably about 0.7 to about 0.8 inch-ounces (about $4.9 \times 10^{-3}$ to $5.6 \times 10^{-3}$ newton meters). On the other hand, a cartridge (of the type shown at 22) containing a larger film load requires, because of the greater film mass being handled, a relatively greater driving force in the neighborhood of 1.0 to 1.5 inch-ounces. To provide driving forces in both of the above ranges, the camera drive mechanism desirably includes a drive force varying mechanism that may be selectively actuated to vary the drive force output in accordance with the particular force requirements of the cartridge being handled.

FIG. 2 is an exploded perspective view of such a mechanism. A gear member 40 is arranged to be driven by a drive motor carried by the camera. A raised annular wall 42 rises from one flat face 41 of the gear and extends in an axial direction toward the cartridge-receiving chamber 12. An undulate friction washer 44 formed of a thin resilient material such as sheet brass is received within wall 42. A radially-extending portion 45 enters into a shallow recess 47 formed in the face of gear 40 to secure washer 44 to gear 40 for rotation therewith. A fibrous washer 46 is interposed between undulate washer 44 and a force plate assembly 48. Elements 40, 44, 46, and 48 are held together in an assembled relation by an annular retaining ring 50 that is closely received within the annular wall 42 carried by gear 40 (see also FIG. 6).

Figure 7:
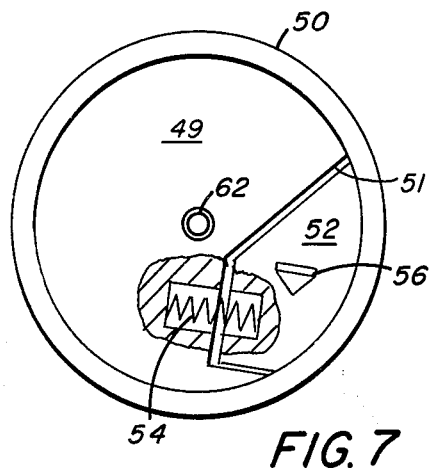
FIG. 7 is a plan view of the apparatus of FIG. 6.

The generally circular force plate assembly 48 includes a first plate member 49 and an irregularly shaped second plate member 52 which is received within a correspondingly irregularly shaped cutout portion 51 in first plate member 49. Plate members 49 and 52 are interconnected by a coil spring 54 (see FIG. 7) which urges the second plate member 52 generally radially outward from the center of plate 49 and into engagement with the inner surface of annular gear wall 42. A raised lug 56 carried by plate member 52 extends toward cartridge cavity 12 for entry into driving engagement with cooperating cartridge core structures described hereinbelow. In the above arrangement, rotation of gear 40 by the drive motor rotates force assembly 48 to drive the cartridge core. Rotation of plate assembly 48 by gear 40 occurs because of the radially-directed frictional contact forces provided by the spring-loaded plate 52 and the axially-directed forces provided by the resilient washer 44.

To adjust the driving force output of the above mechanism, pressure may be applied to the outer face 58 of plate assembly 48 to move plate assembly 48 axially toward gear face 41. Such pressure tends to compress resilient washer 44, thereby flattening its undulations 43 and increasing the frictional forces applied between gear 40 and force plate assembly 48. In a first condition, wherein washer 44 is relatively uncompressed because of the relative absence of axial pressure against plate assembly 48, the drive assembly is operable to produce a relatively low driving force suitable for use with cartridges of the type requiring a force in the range of 0.5 to 1.0 inch-ounces. By applying axially-directed pressure to plate assembly 48, the drive force output may be increased to a range of about 1.0 to 1.5 inch-ounces whereby a cartridge having need of greater driving force may be handled.

Figure 6:
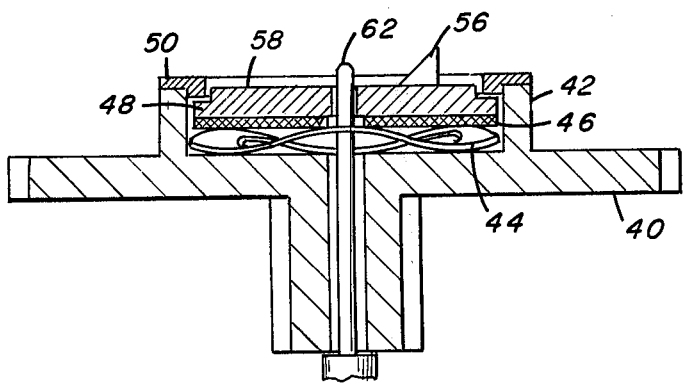
FIG. 6 is a cross-section through the assembled apparatus of FIG. 2.

As illustrated, the drive assembly members are centrally apertured (as at 60 in force plate assembly 48) to accept a disabling device 62 (see FIG. 6 and see U.S. patent application Ser. No. 250,352) for cooperation with an anti-backup mechanism of a film cartridge as disclosed in commonly-assigned copending U.S. patent application Ser. No. 323,019 entitled "Disengageable Anti-Backup Device for Film Cartridge", filed on Jan. 12, 1973 in the name of Archie J. Tucker now U.S. Pat. No. 3,831,881.

FIGS. 3 and 4 show a cartridge core assembly cooperable with the adjustable drive mechanism described above for increasing the drive force output of such drive mechanism.

FIG. 4 is a sectional view of such core assembly and shows the core 30 mounted for rotation about its central axis A—A. Core mounting support is provided by an elongate spindle 64 which is carried by the cartridge wall 66 and which is receivable within a central bore 68 defined in part by the inner walls of a central post 70 carried by core 30. Core 30 includes a generally radially oriented support wall 72 disposed between the opposite axial ends of the core. An annular wall 74 extends from support wall 72 toward one core end. Annular wall 74 is disposed in generally concentric spaced relationship with central post 70, thereby defining an open-ended annular well 76.

As seen in FIG. 4, a plate 78 having a central aperture 80 (see FIG. 3) adapted to receive the distal end of post 70 is positioned at the open end of well 76. Plate 78 is mounted for limited axial sliding movement along a generally cylindrical portion 81 of post 70. When cartridge 22 is received within camera cavity 12, plate 78 aligns generally coaxially in face-to-face relationship with camera force plate assembly 48. A plurality of upstanding lugs 82 extend a predetermined uniform distance axially from the outer face of plate 78 toward force plate assembly 48. Such lugs 82 are adapted to contact the outer face of force plate assembly 48 and each such lug is also adapted to enter into driven relationship with the camera drive lug 56. Plate 78 defines a pair of generally diametrically-spaced notches 84 at the other periphery, notches 84 being adapted to mate with a pair of elongate ribs 86 extending axially along the inner surface of core wall 74 at generally diametrically spaced positions. Such mating permits axial sliding movement of plate 78 along ribs 86 while effectively preventing relative rotation of plate 78 with respect to core 30.

Disposed within well 76 and extending between support wall 72 and plate 78 is a spring member 88 so arranged as to urge plate 78 axially outward away from wall 72. As seen in FIGS. 3 and 4, spring member 88 may comprise a single coil spring surrounding core post 70, although other arrangements, such as a plurality of small coil springs arranged at spaced locations around post 70, may be visualized.

The core elements described above may be assembled conveniently if post 70 is of a deformable plastic material and is initially of a diameter sufficient to enter plate aperture 80. In this manner, spring member 88 is simply placed in the well 76, plate 87 positioned on post 70, and the distal end of post 70 deformed, as by applying heat and/or pressure to produce a radial flange 90 of sufficient diameter to retain plate 78 on post 70.

In operation, a cartridge of the type requiring a relatively high drive force is equipped with the core assembly described above. Upon insertion of such cartridge into camera cavity 12, the spring member 88 causes plate 78 to press against camera force plate assembly 48, thereby causing the camera drive apparatus to apply a relatively greater drive force to the cartridge core 30. For cartridges of a type requiring a lesser driving force, the spring member 88 may be so designed (in accordance with known engineering techniques) as to exert relatively less spring force. Alternatively, a cartridge core may be provided without the force-applying elements 78 and 88 whereby the camera drive force output is dictated solely by the internal frictional characteristics of the camera drive assembly, whereby a relatively low driving force is provided. Such a core is described in the aforementioned U.S. patent application Ser. No. 248,514 entitled "Film Cartridge", filed on Apr. 28, 1972 in the name of S. H. Miller now U.S. Pat. No. 3,785,726.

The core assembly described avoids the aforementioned core tilt problems arising from the concentration of force on the core at a single point radially removed from the core axis of rotation. In the arrangement herein described, the spring member 88 distributes the actuating force on support surface 72 to provide an effective force that is directed generally parallel to the axis of rotation A—A. The provision of a plurality of lugs 82 serves also to distribute pressure evenly to spring member 88, inasmuch as some slight tilting of the disc 78 is permitted by its mounting structure.

It should be understood from the specification that a drive mechanism of the present invention is suitable for providing a wide range of driving forces by selecting different sizes and materials to be used in the drive components and also by controlling the dimensions and placement of the friction increasing mechanism. Thus, while the invention has been described in detail with particular reference to a preferred embodiment thereof and its use with two different types of cartridges, other variations and modifications can be effected within the spirit and scope of the invention.

What is claimed is:

1. In a cartridge for handling a photosensitive web strip and having means, including a generally cylindrical rotatable core for use in transporting said strip through said cartridge, said cartridge being receivable in a camera of the type having drive means for rotating said core and having actuatable clutch means for adjusting the driving force produced by said drive means; the improvement wherein said cartridge core carries means for applying an actuating force directed generally parallel to the axis of rotation of said core, said actuating means comprising:
   means carried by said core for defining a support surface disposed between the opposite axial ends of said core and facing one of said ends;
   plate member means disposed adjacent said one core end for entry into operable relationship with said camera clutch means when said cartridge is received in said camera;
   means for mounting said plate member means for limited movement along said core axis; and
   spring means supported by said support surface for moving said plate member means along said core axis away from said support surface to actuate said clutch to responsively adjust the driving force applied to said core.

2. The apparatus of claim 1 wherein said plate member mounting means includes (a) an elongate post extending along said core axis and having a distal end adjacent said one core end and a proximal end adjacent said support surface, said post including a generally cylindrical portion adjacent said distal post end, and (b) a central aperture formed in said plate member and dimensioned to slidably receive said cylindrical post portion therein.

3. The apparatus of claim 2 wherein said core further includes wall member means for defining an annular well surrounding said post and extending from said support surface toward said one core end, said spring means being disposed within said well in supported relationship with said support surface.

4. The apparatus of claim 3 wherein said spring means comprises a helically coiled spring surrounding said post.

5. The apparatus of claim 4 wherein said plate member means defines a pair of generally diametrically opposed radially extending recesses at the peripheral edge of said plate, said radial recesses being operable to slidably receive respective ones of a pair of generally diametrically opposed ribs carried by said wall member means.

6. The apparatus of claim 5 wherein said post includes a radially extending flange at said distal post end for limiting the axially outward travel of said plate member along said post.

* * * * *

UNITED STATES PATENT AND TRADEMARK OFFICE
CERTIFICATE OF CORRECTION

PATENT NO. : 3,929,304
DATED : December 30, 1975
INVENTOR(S) : Francis A. Williams It is certified that error appears in the above—identified patent and that said Letters Patent are hereby corrected as shown below:

Column 5, line 46, delete "other" and insert --outer--;

Column 5, line 66 delete "87" and insert --78--.

Signed and Sealed this

Sixteenth Day of November 1976

[SEAL]

Attest:

RUTH C. MASON
*Attesting Officer*

C. MARSHALL DANN
*Commissioner of Patents and Trademarks*